United States Patent [19]

Duncan

[11] 4,399,629

[45] Aug. 23, 1983

[54] COLLECTING APPARATUS

[75] Inventor: Charles P. Duncan, Walnut Creek, Calif.

[73] Assignee: The United States of America as represented by the United States Department of Energy, Washington, D.C.

[21] Appl. No.: 240,688

[22] Filed: Mar. 5, 1981

[51] Int. Cl.³ .............................................. A01K 73/00
[52] U.S. Cl. ........................................ 43/4; 73/863.23
[58] Field of Search .................... 43/4, 7, 9; 209/252, 209/259, 274, 281; 73/863.23; 15/347, 352

[56] References Cited

U.S. PATENT DOCUMENTS

| | | | |
|---|---|---|---|
| 2,022,249 | 11/1935 | Lofgren | 15/352 |
| 2,890,543 | 6/1959 | Mitchell | 43/9 |
| 3,597,903 | 8/1971 | Schaaf | 15/347 X |
| 3,740,933 | 6/1973 | Hollowell | 15/352 |
| 3,931,740 | 1/1976 | Carter | 73/863.23 |
| 4,089,131 | 5/1978 | Phillips | 43/4 |

Primary Examiner—Nicholas P. Godici
Assistant Examiner—M. Jordan
Attorney, Agent, or Firm—L. E. Carnahan; Roger S. Gaither; Richard G. Besha

[57] ABSTRACT

An improved collecting apparatus for small aquatic or airborne organisms such as plankton, larval fish, insects, etc. The improvement constitutes an apertured removal container within which is retained a collecting bag, and which is secured at the apex of a conical collecting net. Such collectors are towed behind a vessel or vehicle with the open end of the conical net facing forward for trapping the aquatic or airborne organisms within the collecting bag, while allowing the water or air to pass through the apertures in the container. The container is readily removable from the collecting net whereby the collecting bag can be quickly removed and replaced for further sample collection. The collecting bag is provided with means for preventing the bag from being pulled into the container by the water or air flowing therethrough.

7 Claims, 5 Drawing Figures

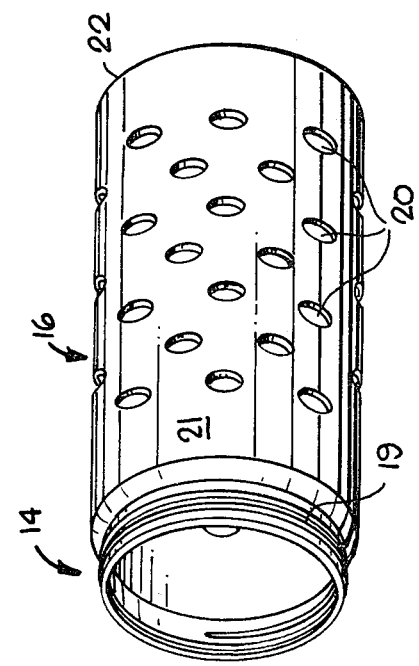
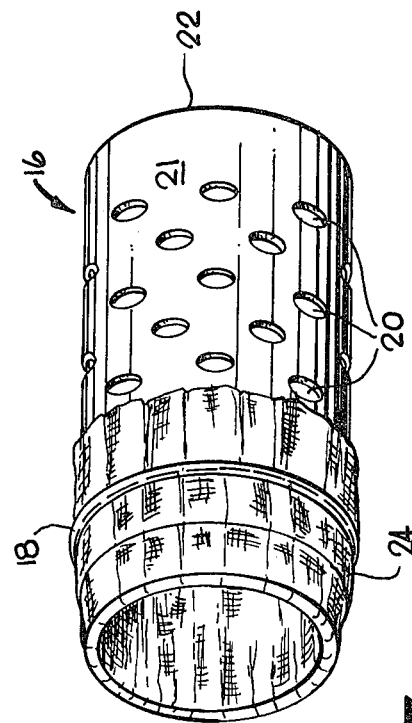
Fig. 2
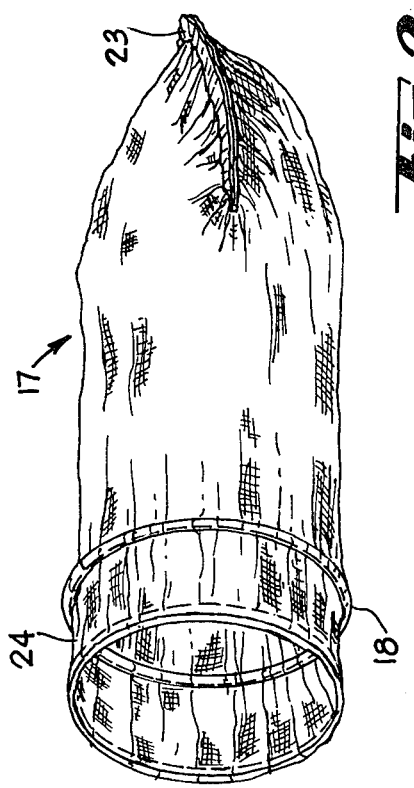
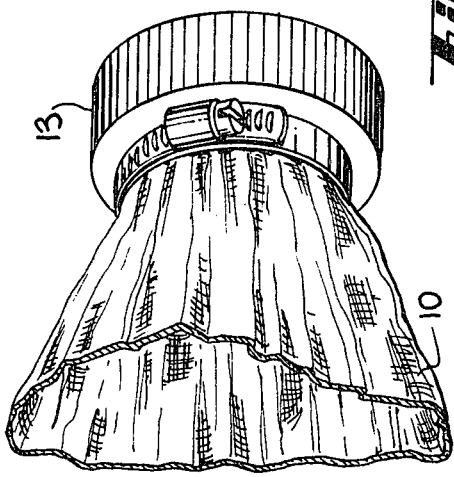
Fig. 3

COLLECTING APPARATUS

BACKGROUND OF THE INVENTION

The invention described herein arose at the Lawrence Berkeley Laboratory in the course of, or under Contract No. W-7405-ENG-48, between the U.S. Department of Energy and the University of California.

The invention relates to an improved apparatus for collecting small aquatic or airborne organisms, and, more particularly, to a readily removable, apertured container secured to the apex of a conical collecting net, and within which a collecting bag is retained, which readily allows the water or air to pass through the container while collecting the organisms in the bag.

Various types of apparatus have been developed for collecting small aquatic organisms, such as plankton, and insects. The collecting apparatus includes a conical net and a collecting container which is towed behind a vessel or vehicle, whereby the aquatic organisms or insects are collected. In some applications the collecting apparatus is dropped into the water or air from a vessel or platform and raised vertically to collect the desired specimens. U.S. Pat. Nos. 2,720,047 issued Mar. 19, 1953 to J. D. Isaacs, 3,461,591 issued Aug. 19, 1969 to D. M. Brown et al., and 3,900,982 issued Aug. 26, 1975 to W. F. Gale, are illustrative of the prior known collecting apparatus for aquatic organisms. In addition, apertured containers have been utilized for collecting fish, as illustrated by U.S. Pat. No. 2,721,411 issued Oct. 25, 1955 to C. E. Pedersen.

Recently, due to programs to develop various types of energy sources, efforts have been directed to obtaining energy from the ocean. Such an effort is exemplified by the Ocean Thermal Energy Conversion (OTEC) Program being carried out by the U.S. Department of Energy. However, such efforts will affect the natural environment of the ocean to a certain extent and thus environmental studies are being done, which studies include the collection of plankton so that these environmental effects can be assessed.

The plankton collecting apparatus or nets have been generally satisfactory except for the collecting pouch or container (cod end). A plankton net typically has a long conical shape (about 1.5 meters long) and is made of a closely woven, but porous, material such as nylon. The large open end of the plankton net is towed through the water behind a ship, or vertically through the water column from a stationary ship. Plankton entering the net are forced back toward the apex of the cone where they are collected in the cod end (pouch or container). The cod ends, as illustrated by the above referenced patents, have been made with permanent mesh inserts and constructed such that a certain amount of the collected plankton was concentrated near the apex of the plankton net and not collected in the pouch or container. Also, the collected samples were difficult to remove from the pouch.

Another prior approach for collecting plankton utilized a cod end composed of a watertight flexible outer bag with an inner mesh bag. During sampling, a zippered window in the side of the outer bag is opened to let water flow through the bag. This zippered window design is expensive, clumsy to operate on deck, and difficult to wash clean. Further, the zippers have a tendency to be fouled by the surrounding material.

Utilization of existing plankton sampling equipment illustrated a need for a more simple, less expensive, and a more easily operated cod end of the collecting nets to enable effective collection of the plankton and easy removal of the cod end and handling of the collected samples.

Accordingly, it is an object of the present invention to provide an improved cod end of an apparatus for collecting small aquatic organisms and insects.

A further object of the invention to provide a cod end of a plankton collecting net having a readily removable, apertured container within which is removably retained a collecting bag for the plankton.

Another object of the invention is to provide an improved plankton collecting apparatus having at the apex of the collecting net an apertured container screw-threaded to the net and containing therein a collecting bag which is retained in the container by the screw-threaded connection.

Another object of the invention is to provide an improved collecting apparatus which utilizes a collecting bag within an apertured container and which is secured in the container by having the open end of the bag folded back over the outside of the container and retained by being compressed by the container connecting means and/or a cord or band secured to the bag which prohibits the bag from being pulled through the connecting means into the container.

SUMMARY OF THE INVENTION

The present invention is an improvement over the existing apparatus for collecting small aquatic or airborne organisms which includes a funnel or conical shaped net having a collection container removably secured to the apex of the net. The improvement provided by the present invention comprises an apertured container and a collecting bag supported within the container, the open end of the bag being folded over part of the outer surface of the container and retained by at least the compression between the container and the means for connecting the container to the conical net. A specific embodiment of the invention utilizes a threaded connector between the container and the net connecting means, and also utilizes a cord secured to the net for preventing the open end of the collecting bag from being pulled through the connecting means into the container. The invention provides a simple and inexpensive apparatus for collecting plankton, for example, whereby the collecting bag is readily removed from the apertured container, emptied, and returned to the container, or a new bag can be installed for further sample collection. The collecting bag with its plankton samples may be put directly into a preservative, thus eliminating the need for removing the plankton from the bag.

The invention will become more readily apparent from the accompanying drawings and the following description.

BRIEF DESCRIPTION OF THE DRAWINGS

FIG. 2 is a view of the embodiment of the invention of FIG. 1 with the bag removed fron the container;

FIG. 3 is a view with the FIG. 2 embodiment positioned for connection with a coupling mechanism of the collection net of FIG. 1;

DESCRIPTION OF THE PREFERRED EMBODIMENT

The present invention is an improved apparatus for collecting small aquatic or airborne organisms, such as plankton. More specifically, the invention is a simplified organism-net cod-end of a collecting apparatus which includes an apertured container (cod-end) and collecting bag (net) which is readily connected to and removable from a towed collecting mechanism.

The advantages of the present invention are that it is much lighter and less expensive, has water flow through the cod-end to concentrate the collected organisms therein, and eliminate the wash-down problems where the cod-end couples to the collecting mechanism.

While the invention is described hereinafter with respect to its application for collecting plankton, it is not limited to this particular use but finds various applications for collecting small aquatic or airborne organisms.

Figure 1:
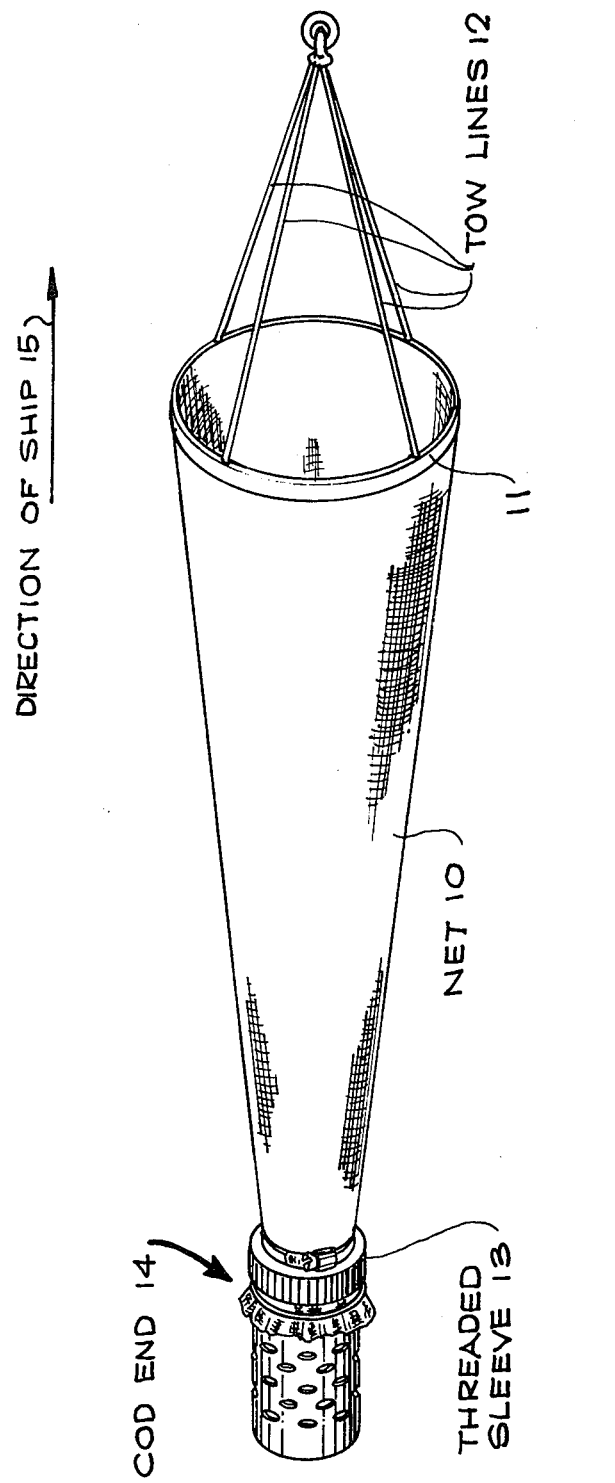
FIG. 1 is a view illustrating an embodiment of the invention connected to a collection net.

Referring now to the drawings, FIG. 1 illustrates a typical plankton collecting mechanism utilizing the cod-end (container and bag) of the present invention. The collecting mechanism comprises a tapered or conical shape net 10 of closely woven, but porous, material, such as nylon. The larger end of the net 10, indicated at 11, is connected to a plurality of tow lines 12, while the smaller end or apex of the net terminates in a coupling or threaded sleeve 13, to which a cod-end or container indicated generally at 14 is connected. The collecting apparatus is towed by lines 12 from a ship or vessel in the direction indicated by arrow 15, such that plankton and water passes within net 10 into cod-end 14 where the plankton is collected while allowing the water to pass through via apertures in cod-end 14. The collecting apparatus may be moved vertically, rather than horizontally, through the water from a vessel or platform for collecting plankton in cod-end 14.

Cod-end 14, and its connection to coupling 13, is illustrated in detail in FIGS. 2–5. As shown in FIG. 2, cod-end 14 consists of three (3) components; namely, a bucket or container 16, a bag or sleeve 17, and a cord or retainer 18 secured to bag 17.

Figure 4:
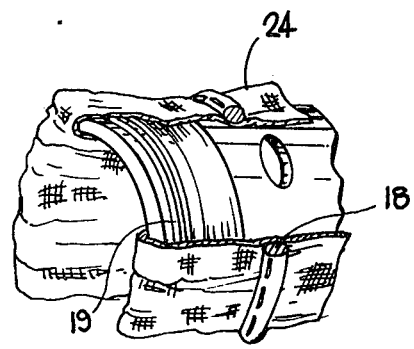
FIG. 4 is a cut-away view of a portion of FIG. 3.
Figure 5:
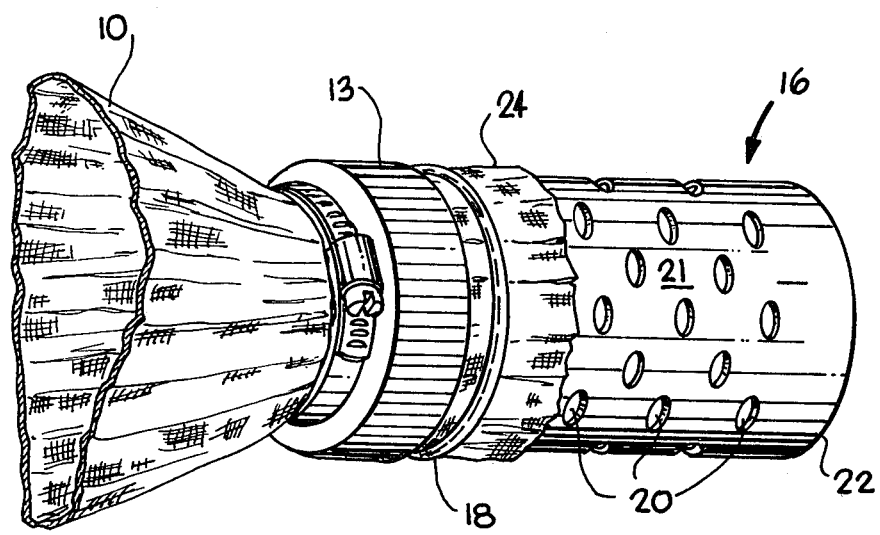
FIG. 5 illustrates the FIG. 2 embodiment of the invention connected to the coupling mechanism of FIG. 3.

Bucket or container 16, may be constructed of a plastic, such as polyethylene, being threaded at 19 for connection to coupling or collar 13 at the apex of collecting net 10 (see FIGS. 3–5). Bucket 16 is provided with a plurality of holes or apertures 20 located in spaced relation on the side surface 21 and closed end or bottom 22 of the bucket, although the apertures in the closed end or bottom 22 may be omitted, if desired. The holes or apertures 20 are placed in bucket 16 so as to allow maximum flow of water through the bucket, thereby preventing water build-up at the lower or aft end of the bucket, which forces the plankton toward the top of the bucket. The holes 20, for example, are ¼ inch diameter with edges of the hole being smooth, with no projections or sharp edges which might puncture the bag or sleeve 17. In the embodiment illustrated, the bucket, made of polyethylene, has a length of about 17 cm, a diameter of about 9 cm, with a volume of about 1,080 cm$^3$.

The sleeve or bag 17 may be of the same material as the net 10, for example, 202$\mu$ nylon, and fits snuggly inside bucket 16 and has a length to enable folding the upper or open end 24 thereof over the threads 19 of bucket 16, as shown in FIGS. 3 and 4. All sewing of the sleeve 17 is done with rot-proof thread, such as polyester, and the selvage 23 is on the outside to avoid plankton being caught in the seam. The lines of the sleeve 17 are smoothly curved for the same reason.

The cord on retainer 18 may be constructed of nylon, for example. The cord may be sewn to the outside of sleeve 17 (see FIG. 2) and functions to prevent the upper end 24 of the sleeve from being forced entirely into the bucket 16 by the pressure of the water when the net 10 is towed or hauled up. The cord 18 need not be sewed to sleeve 17 but can be slipped over the sleeve after upper end 24 is folded back over the threaded section 19 of bucket 16 and functions to prevent the bag from being pulled through the coupling 13 into bucket 16. An elastic ring or retainer can be used in place of the cord, provided it functions to prevent movement of sleeve 17 into bucket 16.

In operation, with sleeve 17 positioned in bucket 16, as shown in FIG. 3, the bucket is threaded into coupling or collar 13 as shown in FIG. 5, whereupon the apparatus shown in FIG. 1 is positioned for use, as known in the art. The collar 13 may be made of molded plastic (PVC). Upon completion of a collecting sweep, either horizontally or vertically, the bucket 16 is readily removed from collar or coupling 13 and the plankton removed from the sleeve 17, as described hereinafter. The sleeve 17 may be washed and returned to bucket 16 and connected to coupling 13 or another similarly constructed sleeve may be inserted into the bucket for another collecting sweep of the net 10.

Testing of the invention has been carried out which showed that the sleeve 17 folded back over the threads 19 of bucket 16 could be screwed into collar 13 of the net 10 repeatedly, without damage to the sleeve. This is possible because the threads 19 on the bucket are a loose fit in the collar 13, and cord 18 prevents the bag from being pulled through the threaded collar. In addition, collar 13 is made of (molded) PVC, the sleeve 17 is nylon, and the bucket 16 of polyethylene, which is a progression from hard to soft. Tests were made with a variety of nets, buckets and fabric and no tearing of the sleeve was found. The tests conducted showed that:

1. The same perforated bucket and sleeve used on thirty two hauls or sweeps gave no loss.
2. The sleeve was not cut by the threads of the bucket.
3. The sleeve did not pull through the threads into the bucket.
4. Neither the sleeve nor the bucket clogged.
5. Washing-down the net was easily done with a sea-water hose with the net hanging vertically, and careful inspection showed no plankton caught at the join (collar) where net meets cod-end.

These tests also established that the sleeve could be easilty washed down for removing the plankton, with quick return of the sleeve to bucket for another sweep or haul of the net. However, in practical applications a plurality of sleeves would be used to speed up the sweeping operation and the sleeves containing plankton could be placed in a "pickling" bottle of preservative and seawater, if desired.

It has thus been shown that the present invention provides an improved cod-end of a net assembly or mechanism for collecting airborne or aquatic organisms, such as plankton. The quickly removable sleeve or bag inside the apertured bucket or container is readily attached and removed from the apex of the net mechanisms or traps, thereby substantially increasing the efficiency of the sweeping operation, while overcoming the disadvantages of the prior known cod-ends of the net mechanisms.

While a particular embodiment of the invention has been illustrated and described, modifications will become apparent to those skilled in the art, and it is intended to cover in the appended claims all such modifications as come within the spirit and scope of the invention.

What I claim is:

1. In a towed type collecting apparatus for small aquatic or airborne organisms having a tapering collecting net and a collecting means removably secured to an apex of said tapering net, the improvement comprising:
   said collecting means consisting of:
   (a) a removable, apertured container, and
   (b) a porous collecting bag removably retained within said container, said collecting bag including an open end portion adapted to be folded over an outer section of said apertured container;
   said collecting bag being retained in said apertured container at least by compression of screw-threaded connecting means for removably connecting said container to said tapering net.

2. The improvement set forth in claim 1, wherein said apertured container has a tubular configured body with a bottom closed end and an open end opposite said bottom end constructed to be secured to said tapering net, said tubular body being provided with a plurality of apertures.

3. The improvement set forth in claim 2, wherein said screw-threaded connecting means for removably connecting said container to said tapering net includes a connecting means of the screw-threaded type positioned on said tapering net, and said open end of said tubular body of said container is provided with threads which cooperate with said screw-threaded connecting means of said tapering net.

4. The improvement set forth in claim 3, wherein said open end portion of said collecting bag extends past said threads on said tubular body of said container and is folded back over an outer section of said tubular body of said container, said collecting bag being secured in said container by at least compression thereof between said threads on said container and said screw-threaded connecting means of said tapering net.

5. The improvement set forth in claim 4, additionally including means positioned about said open end of said collecting bag for retaining said bag on an outer surface of said apertured tubular body and preventing said bag from being pulled into said container through said screw-threaded connecting means.

6. The improvement set forth in claim 1, wherein said open end portion of said collecting bag which is folded back over an outer section of said apertureed container is provided with means positioned about said open end portion such that said collecting bag is secured to said container at least by compression between said container and said screw-threaded means connecting said container to said tapering net, said means positioned about said open end portion of said collecting bag functioning to prevent said bag from being pulled into said container.

7. The improvement set forth in claim 6, additionally including a cord-like means positioned about and secured to said open end portion of said collecting bag for retaining same on an outer surface of said apertured container.

* * * * *